UNITED STATES PATENT OFFICE.

KILIAN EGGER, OF SOUTH CORTLAND, NEW YORK.

IMPROVED METHOD OF EXTRACTING CREAM FROM WHEY.

Specification forming part of Letters Patent No. 58,232, dated September 25, 1866.

*To all whom it may concern:*

Be it known that I, KILIAN EGGER, of the town of South Cortland, Cortland county, New York, have invented a new and Improved Process for Extracting Cream from Whey after cheese-curd has been separated from it; and I do hereby declare that the following is a full and exact description thereof.

My improved process for extracting the cream is as follows: After the cheese-curd has been separated from the whey, I put the whey in zinc tanks, or tanks with zinc bottoms, about one foot deep, and to ten gallons of whey put in a handful of salt. I put the tanks containing the whey in a cool place, and, if possible, standing in running water or upon a very cool cellar-floor, the cooler the better, so that the temperature of the whey shall be from 50° to 60° Fahrenheit; but it is better to be as near 55° as may be. I let the whey stand in the tanks thus placed from twenty to twenty-four hours, and the cream is then ready for skimming. It should be kept at the same degree of coolness (55° or thereabout) for churning, that being cooler than the common method for churning cream.

In order to keep the tanks in proper order they must be scalded and kept extra clean and sweet.

The churning may be in any of the ordinary methods, and the butter will be of a superior quality.

What I claim as my invention or discovery is—

The process above described for extracting the cream from the whey, substantially as above described.

KILIAN EGGER.

Witnesses:
D. C. MARKHAM,
N. B. SMITH.